UNITED STATES PATENT OFFICE.

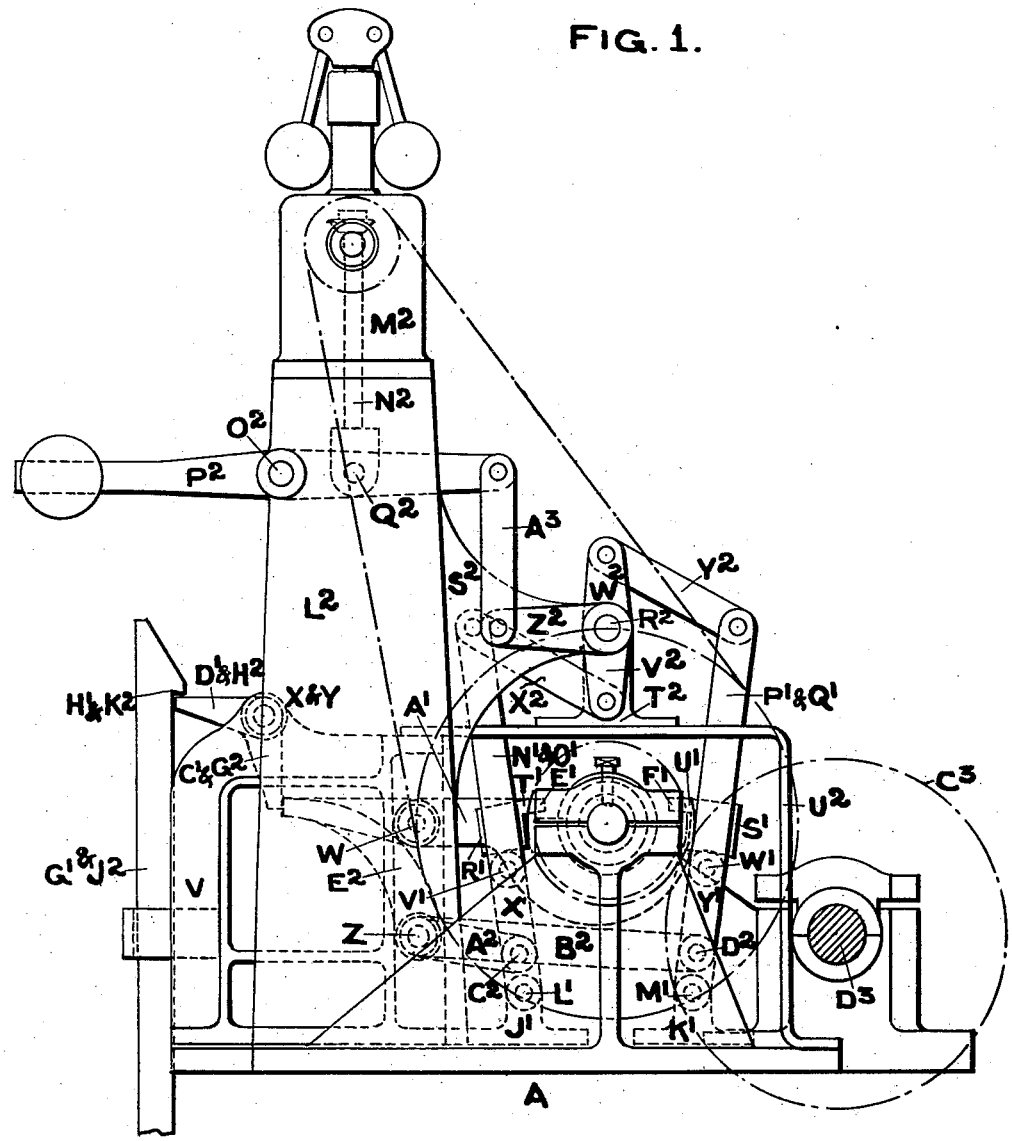

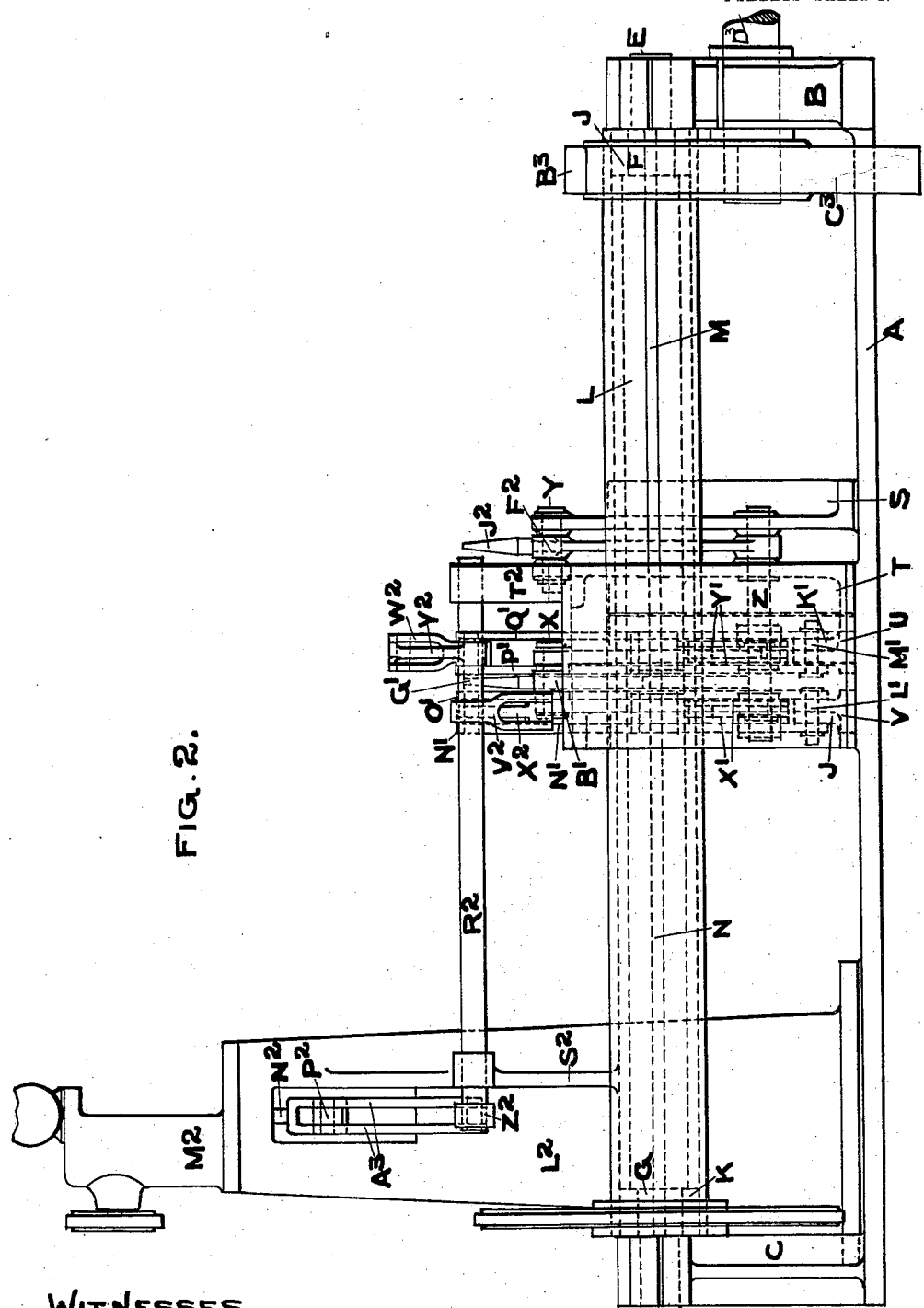

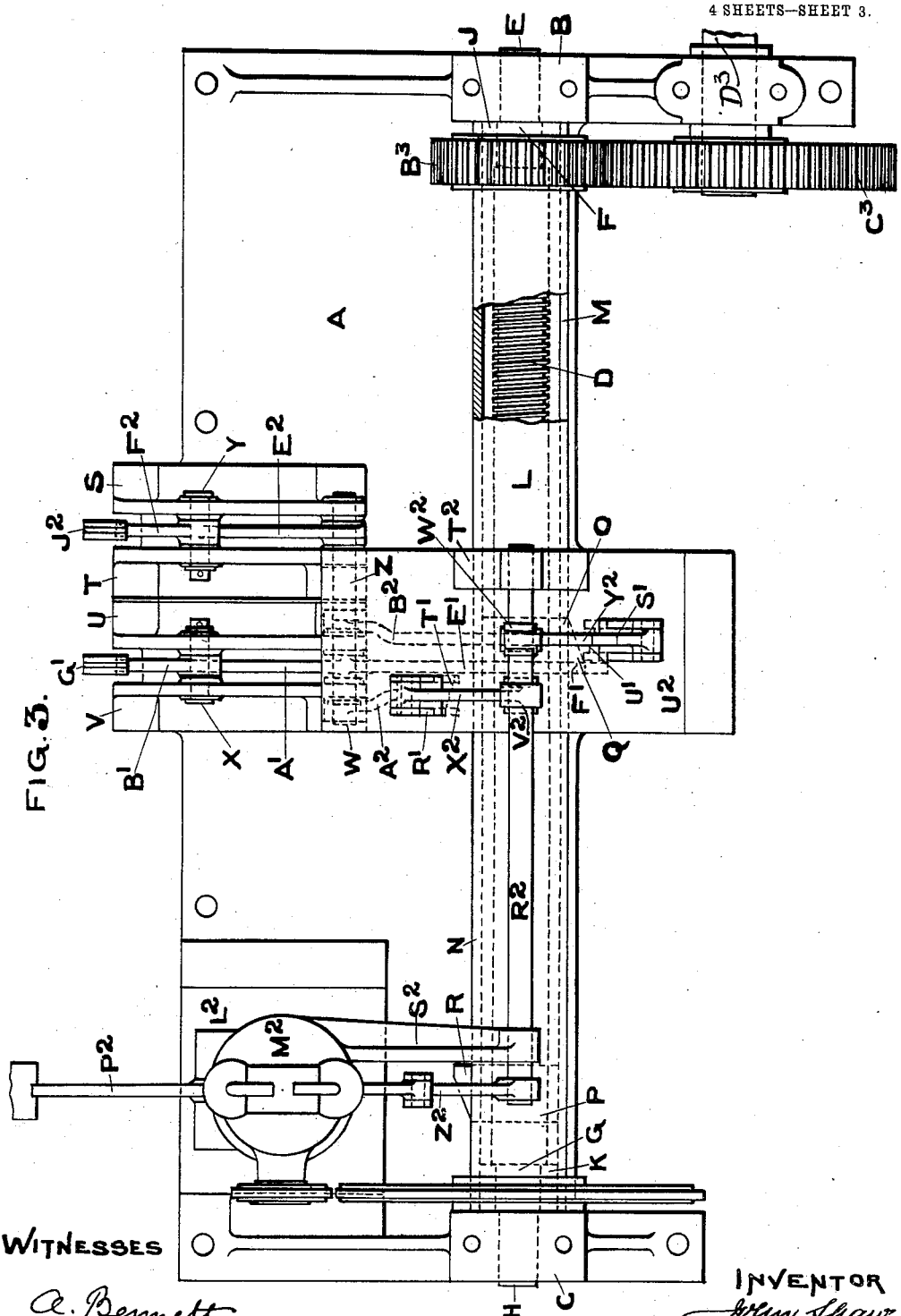

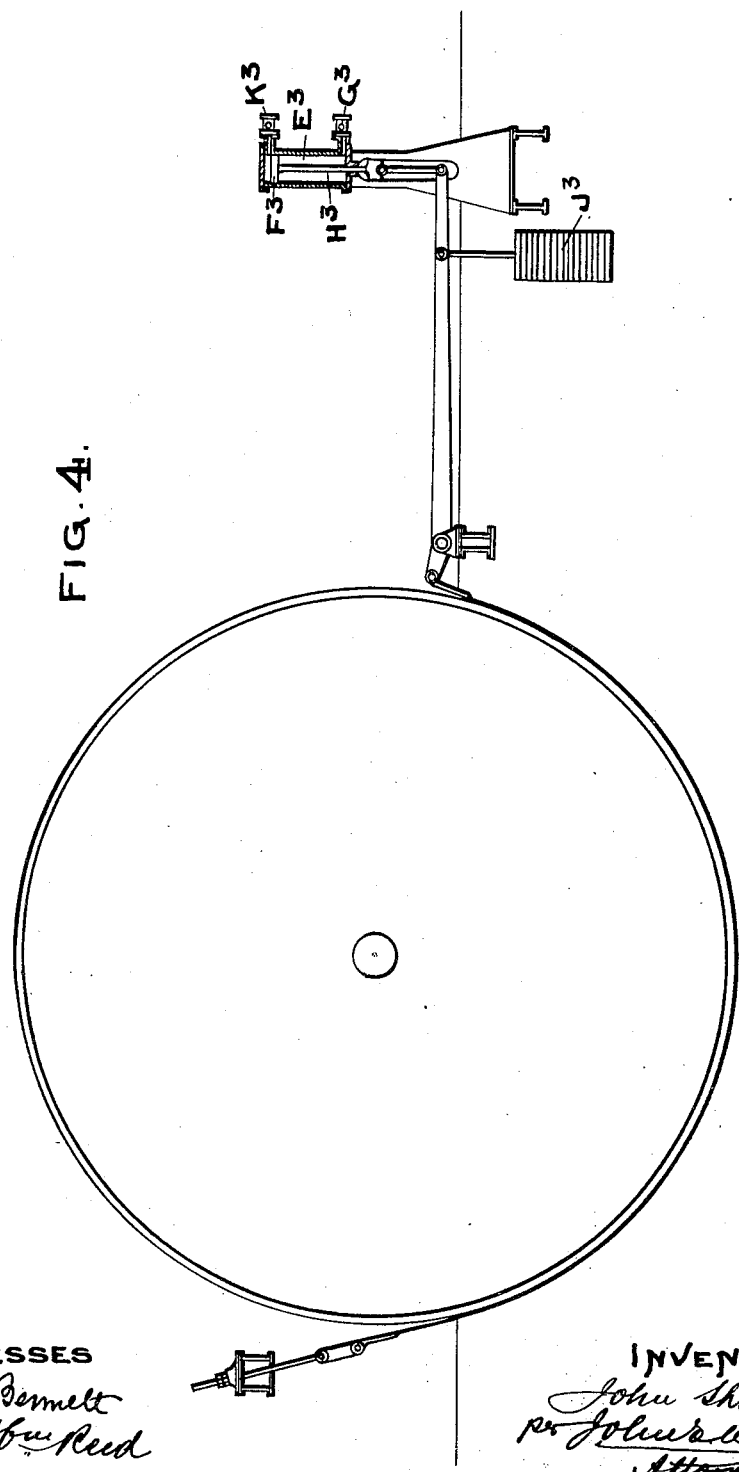

JOHN SHAW, OF KIRBY MOORSIDE, NORTH RIDING, ENGLAND; JOHN REGINALD SHAW, OF ELMSALL LODGE, PONTEFRACT, ENGLAND, ADMINISTRATOR OF SAID JOHN SHAW, DECEASED.

GEAR FOR THE PREVENTION OF OVERWINDING.

1,017,600.    Specification of Letters Patent.    Patented Feb. 13, 1912.

Application filed June 19, 1911. Serial No. 634,015.

*To all whom it may concern:*

Be it known that I, JOHN SHAW, a subject of the King of Great Britain and Ireland, residing at Welburn Hall, Kirby Moorside, in the North Riding of the county of York, England, have invented a new and useful Improvement in Gear for the Prevention of Overwinding and for Controlling the Speed of Winding and Hauling Engines and the Like, of which the following is a specification.

This invention relates to improvements in gear for the prevention of overwinding pit cages, and for automatically controlling the speed of winding, hauling, hoist, and like engines, whether operated by steam, compressed air, electricity, or other power. For this purpose apparatus has already been described in which brake releasing or stop valve closing mechanism is actuated either from a traveling nut or nuts on a rotating screw shaft or shafts by lever and trip gear controlled from a governor, or from cams on a rotating and longitudinally traversing screw shaft by lever and trip gear adapted to be moved into and out of the path of the rotating cams under the influence of a governor. Apparatus has also been described in which motor stopping gear is actuated from a nut which is traversed along a normally non-rotating screw by means of a rotatable concentric hollow shaft having a keyway engaging with the nut. Brake apparatus has also been described in which the brake is normally applied by fluid under pressure being caused to escape under one of the faces of the brake piston and in which the completion of the application of the brake is obtained by the admission of this fluid to the opposite face of the piston.

My present invention consists in an improved gear of the type above referred to, which provides for the shutting-off of steam, and for the application of a brake if the speed of the engines has not been reduced when the ascending cage reaches a predetermined point in the shaft, and which also provides for a second brake, or alternatively for greater pressure on the first mentioned brake, to be applied whenever the cage at the surface rises to a predetermined height above the pit bank, or (in the case of hauling engines, hoists, and the like) when the moving load has reached the point where it should stop.

*Description of drawings.*—Figure 1 is a side elevation of my improved safety controlling gear. Fig. 2 is a front elevation of same. Fig. 3 is a plan of same. Fig. 4 is a diagram showing a suitable method of using the gear in conjunction with a single brake.

According to my said invention I use a bedplate A provided with pedestals B and C, and a screw D the ends of which are turned down at E, F, G, and H, the parts E and H being firmly fixed in the pedestals B and C.

On the parts F and G of the screw D are provided two collars J and K, and to these collars J and K is fixed a hollow tube L in which are slots M and N. These slots M and N run from opposite ends of the tube L to the center, and are on opposite sides.

On the screw D are placed two nuts O and P with projections Q and R. The projection Q of the nut O passes through the slot M, and the projection R of the nut P passes through the slot N, of the tube L.

On the bedplate A are fixed two pairs of brackets S, T, and U, V, and in the brackets U and V are provided pins W and X, and in the brackets S and T is provided a pin Y. A shaft Z is also provided passing through the four brackets S, T, U, and V. The pin W, which is carried by the brackets U and V, passes through a bar A', and the pin X which is also carried by the brackets U and V passes through a right-angle trip lever B', one arm C' of which hangs vertically, and the other arm D' extends horizontally. One end of the bar A' is semi-annular, and encircles the bottom half of the tube L, and is provided with internal lips E' and F', which when set are at opposite sides of the tube L and above its center. The other end of the bar A' abuts against the end of the vertical arm C' of the trip lever B'. A weighted bar G′ is provided, having a lip H′ at the top, and this lip H′ rests on the end of the horizontal arm D′ of the trip lever B′.

On the bedplate A, and at either side of the vertical center line of the screw D, are fixed a pair of pedestals J′ and K′, and in these pedestals are provided pins L′ and M′, on each of which are pivoted a pair of levers N′, O′, and P′, Q′. These levers N′, O′, and P′, Q′, stand up at each side of the tube L, and on opposite sides of the bar A′. Betweeen the levers N′ and O′ is fitted a sliding block R′, and between the levers P′ and Q′ is likewise fitted a sliding block S′. These sliding blocks have horizontally stepped lips T′ and U′ projecting at the sides nearest to the screw D, and are so placed between the levers N′ and O′ and between the levers P′ and Q′ that the underside of the lips T′ and U′ come above the center of the screw L and on a level with the projections E′ and F′ of the bar A′. To the underside of the sliding blocks R′ and S′, by means of pins V′ and W′, are attached links X′ and Y′. Fixed on the shaft Z which is carried in the brackets S, T, U, and V, are provided two levers $A^2$ and $B^2$, the other ends of which are attached to the ends of the links X′ and Y′ by means of pins $C^2$ and $D^2$.

On the shaft Z, between the brackets S and T, is fixed a curved lever $E^2$, and on the pin Y which is carried in the brackets S and T is fixed a right-angle trip lever $F^2$ identical with the trip lever B′. One arm $G^2$ of this trip lever hangs vertically, and abuts against the end of the curved lever $E^2$, while the other arm $H^2$ of the trip lever extends horizontally. A weighted vertical bar $J^2$ is also provided similar to the vertical bar G′, and having a lip $K^2$ at the top, which rests on the horizontal arm $H^2$ of the trip lever $F^2$.

On the bedplate A is provided a stand $L^2$, on which is mounted a speed governor $M^2$ driven from the tube L by means of chain and sprocket wheels or other suitable means. In the stand $L^2$ and near to the governor $M^2$ is provided a pin $O^2$, on which is pivoted a balanced horizontal lever $P^2$. To this lever $P^2$ and near to the pin $O^2$ is attached the bottom end of the vertical spindle $N^2$ of the governor $M^2$ by means of a pin $Q^2$.

Over the top of the tube L, and at the same level as the tops of the levers N′, O′, and P′, Q′, and midway between them, that is on the vertical center line of the screw D, is provided a shaft $R^2$. One end of this shaft $R^2$ is supported in a bracket $S^2$ provided in the governor stand $L^2$, or by other suitable support. The other end is supported in a pedestal $T^2$, this pedestal $T^2$ being fixed on a bracket $U^2$, which in turn is fixed to the bedplate A and to the brackets T and V, or may be fixed in any suitable way.

Fixed on opposite sides of the shaft $R^2$ are a pair of levers $V^2$, $W^2$, the lever $V^2$ pointing downward and the lever $W^2$ pointing upward. The lever $V^2$ is connected by means of a link $X^2$ to the top of the levers N′ and O′, while the lever $W^2$ is connected by means of a link $Y^2$ to the top of the levers P′ and Q′. To the shaft $R^2$ is further fixed a horizontal lever $Z^2$, which is connected to the end of the balanced lever $P^2$ by means of a link $A^3$.

On one end of the tube L is fixed a spur wheel $B^3$ which is driven by another spur wheel $C^3$ fixed on a shaft $D^3$, or in place of this, chain and sprocket wheels or other suitable means may be provided to give a rotary motion to the tube L.

The *modus operandi* is as follows:—Motion is transmitted to the shaft $D^3$ from the drum shaft by means of gear wheels and shafts or by means of chain and sprocket wheels. This motion is transmitted through the gear wheels $C^3$ and $B^3$ to the tube L. The tube L thus revolves on the turned parts F and G of the screw D. The screw D is fixed at each end in the brackets B and C, and, as the projections Q and R of the nuts O and P pass through the slots M and N of the tube L, when the tube L revolves the nuts O and P revolve with it, and also move laterally on the screw D, each nut moving in the same direction. Thus when the cages are ascending and descending, the nuts are following their movements, the ascending cage being represented by the nut which is traveling toward the center of the screw, and the descending cage being represented by that nut which is moving away from the center of the screw.

The governor is driven from the tube L by means of chain and sprockets or other suitable means, so that during the operation of winding, the governor balls lift owing to centrifugal force and press the governor spindle $N^2$ down. This deflects the lever $P^2$, and with it the links $A^3$ to which the lever $Z^2$ is attached. The lever $Z^2$ is thus forced down and causes the shaft $R^2$ to move about its axis and with it the levers $V^2$ and $W^2$. The movement of the levers $V^2$ and $W^2$ (through the links $X^2$ and $Y^2$) causes the levers N′, O′, and P′, Q′, to move about the pins L′ and M′, and brings them into an approximately vertical position. The sliding blocks R′ and S′ are thus brought nearer to the tube L, and the lips T′ and U′ are now in such a position that the particular sliding block which is on the same side as the approaching nut will be lifted by the projection on that nut. Thus if at a predetermined point the speed of winding is not reduced, or if after that point is passed the speed is not reduced at the pre-determined rate, the projection on that nut will lift the sliding block, and with it the attached link X' or Y', which in turn conveys the motion to the lever A² or B². These, being fixed to the shaft Z, cause the latter to revolve slightly and thus depress the curved lever E². The lever E² being depressed clear of the trip lever F², this trip lever provides no support for the weighted bar J², which consequently falls, cutting off steam or other motive power, and also applying a brake, and thus automatically pulling up the engine.

Should the speed of the engines be reduced at the pre-determined point, and after that point at the pre-determined rate, the governor balls will fall and allow the sliding blocks to swing clear of the nut projections, but should the engines not be stopped at the proper time, that is to say, when the ascending cage reaches the pit bank, overwinding is automatically prevented in the following manner:—The nut O or P is carried beyond its normal travel and strikes one of the projections E' or F' of the bar A', lifting that side of the bar about the pin W and thus deflecting the other end which abuts against the arm C' of the trip lever B'. The bar A' now being clear of the trip lever B', the latter provides no support for the weighted bar G', which consequently falls, cutting off steam or other motive power and also applying further pressure to the brake and thus pulling up the engine. In the same manner, this overwinding part of the apparatus automatically prevents an overwind in case the engines are started in the wrong direction and the cage at the pit bank is raised instead of being lowered. Separate brakes may be provided, or as described a single brake may be used, in which latter case the speed controlling part of the apparatus would apply to the brake lever the required amount of pressure to either stop the ascending cage before it reached the pit bank, or to greatly reduce its speed before it reached that point, while the overwinding part of the apparatus would apply such further pressure to the brake lever as would prevent an overwind. One of the methods of using the apparatus in conjunction with a single brake is shown in Fig. 4. E³ is a steam cylinder, and as shown steam is on the underside of the piston F³, the threeway valve G³ being open to steam. Thus the piston rod H³ is holding off the brake. At the pre-determined point (should speed not be reduced) the apparatus opens the valve G³ to the exhaust, which is of such small bore that the steam escapes slowly and allows the brake to be applied gradually by the weights J³. Should overwinding be imminent, the apparatus opens the valve K³ to steam, and further pressure is thus applied to the brake by means of the steam piston.

I claim:

1. An overwinding apparatus of the class described comprising a non-rotating screw a nut thereon a projection carried by the nut, a rotatable sleeve having a longitudinal slot through which the projection extends, a governor operated with the sleeve, a pivoted and vertically movable member having a projection adapted to be swung in the path of the projection on the nut and being adapted when in said path to be raised by the said projection, connecting means between said member and the governor whereby excess speed will cause the member to swing to position with the projection on the nut, and braking means operated by raising of the member.

2. In overwinding apparatus of the type in which a traveling nut is traversed along a non-rotating screw (for the purpose of actuating the speed-controlling mechanism) by means of a rotatable concentric tube or hollow shaft engaging with a projection upon the nut; the combination of the permanently fixed screw D, the rotatable tube L having a pair of longitudinal slots M N formed respectively in opposite ends and sides of the tube, the pair of nuts O P upon the screw, and projections Q R on the respective nuts; said projections being slidable within the respective slots so as to traverse the nuts simultaneously in the same direction along the screw as the tube is rotated, and the nuts being alternately operative, each in one direction only, substantially as herein set forth.

3. In overwinding apparatus of the type in which brake releasing or stop valve closing mechanism is actuated from a rotating shaft through the medium of pivoted levers on each side of the shaft having hooks or the like adapted to be moved under the influence of a governor into and out of the path of engaging devices on the shaft; the improved mechanism actuated from the traveling nuts O, P, and comprising levers N' O' and P' Q', sliding blocks R' S' having lips T' U' (the positions of which are controlled by the governor M²), links X' Y', levers A² B², and curved lever E², for the purpose of releasing the trip lever F² and weighted bar J² to cut off the power and apply the brake in case the speed has not been reduced at a pre-determined point or if after that point is passed the speed is not reduced at the pre-determined rate, substantially as herein set forth.

4. In overwinding apparatus of the type in which brake releasing or stop valve closing mechanism is actuated by lever and trip gear from a traveling nut or nuts on a screw shaft or shafts; the pivoted bar or lever A' having a semi-annular end encircling the lower half of the shaft and having internal lips E' F' adapted to be lifted by contact with the traveling nuts O P, for the purpose of preventing overwinding by releasing the trip lever B' and weighted bar G' to cut off the power and stop the engine when the ascending cage reaches the pit bank, substantially as herein set forth.

JOHN SHAW.

Witnesses:
 JOHN E. WALSH,
 ALLAN BENNETT.

---

Copies of this patent may be obtained for five cents each, by addressing the "Commissioner of Patents, Washington, D. C."